(12) United States Patent
Kaneshima et al.

(10) Patent No.: US 11,964,284 B2
(45) Date of Patent: Apr. 23, 2024

(54) METHOD AND APPARATUS FOR SEPARATING EGG SHELL AND EGG SHELL MEMBRANE FROM EACH OTHER

(71) Applicant: BIOAPATITE, INC., Hikone (JP)

(72) Inventors: Keinosuke Kaneshima, Hikone (JP); Koichi Nakamura, Hikone (JP); Masahiro Kawamoto, Hikone (JP)

(73) Assignee: BIOAPATITE, INC., Hikone (JP)

( * ) Notice: Subject to any disclaimer, the term of this patent is extended or adjusted under 35 U.S.C. 154(b) by 0 days.

(21) Appl. No.: 17/438,054

(22) PCT Filed: Mar. 10, 2020

(86) PCT No.: PCT/JP2020/010401
§ 371 (c)(1),
(2) Date: Sep. 10, 2021

(87) PCT Pub. No.: WO2020/184591
PCT Pub. Date: Sep. 17, 2020

(65) Prior Publication Data
US 2022/0040704 A1    Feb. 10, 2022

(30) Foreign Application Priority Data
Mar. 11, 2019    (JP) .................................. 2019-044109

(51) Int. Cl.
*B03B 5/32*    (2006.01)
*A01L 15/00*    (2006.01)
(Continued)

(52) U.S. Cl.
CPC . *B03B 5/32* (2013.01); *B03B 1/04* (2013.01)

(58) Field of Classification Search
CPC .... B03B 5/30; B03B 5/32; B03B 1/04; B03D 1/1418; A23L 15/00
(Continued)

(56) References Cited

U.S. PATENT DOCUMENTS 3,351,195 A     11/1967   Hukki
4,111,798 A *    9/1978   Peterson .................... B01J 8/20
                                                          252/60

(Continued)

FOREIGN PATENT DOCUMENTS

CN          102497935 A      6/2012
CN          102639007 A      8/2012
(Continued)

OTHER PUBLICATIONS

Koichi; Wada, "Method for Removing Protein From Calcareous Material of Biological Origin and Resin Composition Containing Solid Calcium Carbonate Obtained By the Method" (English Translation), Mar. 10, 2010, worldwide.espacenet.com (Year: 2010).*

(Continued)

*Primary Examiner* — Michael McCullough
*Assistant Examiner* — Molly K Devine
(74) *Attorney, Agent, or Firm* — Birch, Stewart, Kolasch & Birch, LLP

(57)    ABSTRACT

Provided is a method that enables sufficient separation of an egg shell and an egg shell membrane from each other even in a small scale, using a simpler configuration than conventional methods. The method for separating an egg shell and an egg shell membrane from each other includes a step of adding an egg shell with an egg shell membrane attached thereto to a swirling flow of an alkaline solution.

14 Claims, 3 Drawing Sheets

(51) Int. Cl.
*B03B 1/04* (2006.01)
*B03B 5/28* (2006.01)
*B03B 5/44* (2006.01)
*B03B 5/62* (2006.01)
*B03B 5/66* (2006.01)

(58) Field of Classification Search
USPC ............................................. 209/173
See application file for complete search history.

(56) References Cited

U.S. PATENT DOCUMENTS

| | | | | |
|---|---|---|---|---|
| 6,176,376 | B1* | 1/2001 | MacNeil | B03B 9/061 |
| | | | | 209/159 |
| 9,873,616 | B2* | 1/2018 | Toman | A23L 15/00 |
| 2011/0303771 | A1 | 12/2011 | Dejong et al. | |
| 2012/0111436 | A1 | 5/2012 | Matsufu et al. | |

FOREIGN PATENT DOCUMENTS

| | | |
|---|---|---|
| CN | 103340441 A | 10/2013 |
| CN | 204560862 U | 8/2015 |
| CN | 105639702 A | 6/2016 |
| CN | 106616505 A | 5/2017 |
| CN | 107343752 A | 11/2017 |
| JP | 1-275512 A | 11/1989 |
| JP | 7-227551 A | 8/1995 |
| JP | 8-173838 A | 7/1996 |
| JP | 2011-184269 A | 9/2011 |
| JP | 2013-233120 A | 11/2013 |
| TW | M405836 U1 | 6/2011 |
| WO | WO 01/66270 A1 | 9/2001 |

OTHER PUBLICATIONS

International Search Report, issued in PCT/JP2020/010401, PCT/ISA/210, dated May 26, 2020.
Notice of Reasons for Refusal for Japanese Application No. 2019-044109, dated May 13, 2020.
Written Opinion of the International Searching Authority, issued in PCT/JP2020/010401, PCT/ISA/237, dated May 26, 2020.
Extended European Search Report for European Application No. 20770300.0, dated Nov. 18, 2022.
Neesse et al., "Practical and Theoretical Aspects of Dense-Flow Classification", Aufbereitungs Technik, Verlag Fuer Aufbereitung, Wiesbaden, DE, vol. 32, No. 9, Sep. 1, 1991, pp. 459-466 and 468 (11 pages total), with an English translation.
Su et al., "Study on High Efficiency and Rapid Separation Technology of Eggshell Membrane", Journal of Jilin Institute of Chemical Technology, vol. 33, No. 9, 2016, pp. 15-20, with an English abstract.

* cited by examiner

METHOD AND APPARATUS FOR SEPARATING EGG SHELL AND EGG SHELL MEMBRANE FROM EACH OTHER

TECHNICAL FIELD

The present invention relates to a separation method and a separation apparatus for separating an egg shell and an egg shell membrane from an egg shell part of an egg.

BACKGROUND ART

Research and development have been conducted on the effective use of egg shells obtained by cracking eggs and removing yolks and whites in food factories that use eggs, especially chicken eggs. In fact, there are products on the market that use egg shells as raw materials. Broken egg shells can be roughly divided into egg shells mainly containing calcium carbonate and egg shell membranes mainly containing proteins. Egg shells are used as raw materials for calcium fortified foods, hydroxyapatite, and other calcium-based products, while egg shell membranes are used as raw materials for protein fortified foods, cosmetics, and other protein-based products. Due to the large difference in composition between egg shells and egg shell membranes, it is important to separate egg shells from egg shell membranes in order to effectively utilize egg shell parts of eggs.

A processing method for separating egg shells and egg shell membranes from each other has been proposed, wherein egg shells from which egg whites and yolks have been removed are fed into a jet mill to crush and dry the egg shells, so that the egg shells are crushed into smaller pieces than egg shell membranes, or that egg shell membranes are detached from the egg shells, and then the egg shells are separated from the egg shell membranes by a vibrating sifter or airflow classifier (Patent Document 1). This method requires large-scale equipment due to the use of a jet mill, and the running cost is high due to the large amount of energy required for the separation operation.

There is also a method and apparatus for separating egg shells and egg shell membranes from each other, including a crushing device to crush egg shells with egg shell membranes attached thereto by water flow; a hydraulic cyclone to separate crushed egg shells from egg shell membranes by the difference in specific gravity; and a separation tank to receive egg shells downstream of the hydraulic cyclone and separate egg shell membranes that remain attached to egg shells or are contained alone by the difference in specific gravity (Patent Document 2). The separation tank includes a cylindrical tank with the bottom being in a shape tapered downward, an agitating blade installed in the lower part of the tank, and a water supply device installed at the bottom of the tank to generate an upward water flow in the tank. The separation method and apparatus described in the patent document 2 has good separation efficiency because of the double separation for egg shell membranes by the hydraulic cyclone and the separation tank, but large-scale and complicated equipment is required.

RELATED ART DOCUMENTS

Patent Documents

PATENT DOCUMENT 1: JPH7-227551A
PATENT DOCUMENT 2: JPH08-173838A

SUMMARY OF THE INVENTION

Problems to be Solved by the Invention

Accordingly, the present invention aims to provide a method and an apparatus that enables sufficient separation of an egg shell and an egg shell membrane from each other even on a small scale using a simpler method than conventional ones.

Means for Solving the Problems

In order to solve the above problems, the present inventors have intensively studied to find that addition of an egg shell part obtained by breaking an egg and removing the yolk and white, i.e., an egg shell with an egg shell membrane attached thereto, into a swirling flow of an alkaline solution can achieve both detachment of an egg shell membrane from an egg shell with the egg shell membrane attached thereto, and separation of the egg shell and the egg shell membrane from each other, thereby completing the present invention.

The present invention provides the following [1] to [11]:
- [1] A method for separating an egg shell and an egg shell membrane from each other, including a step of adding an egg shell with an egg shell membrane attached thereto to a swirling flow of an alkaline solution;
- [2] The separation method according to [1], in which the swirling flow is a vortex flow with a centrifugal force;
- [3] The separation method according to [1] or [2], in which the alkaline solution has a pH of 10 to 14;
- [4] The separation method according to any one of [1] to [3], including a step of collecting an egg shell membrane suspended in the alkaline solution;
- [5] The separation method according to any one of [1] to [4], including a step of collecting a settled egg shell;
- [6] A method for separating an egg shell and an egg shell membrane from each other, using an apparatus for separation of egg shell membrane, the apparatus including:
  - a bottomed cylindrical container with an opening on the top;
  - an alkaline solution supplying part positioned near the bottom of the container side; and
  - an egg shell feeding part positioned near the center of the opening on the top of the container;
  - in which the method includes steps of:
  - adding an alkaline solution from the alkaline solution supplying part to generate a swirling flow of the alkaline solution in the container;
  - adding an egg shell with an egg shell membrane attached thereto from the egg shell feeding part; and
  - collecting an egg shell membrane suspended in a swirling flow of the alkaline solution;
- [7] An apparatus for separating an egg shell and an egg shell membrane from each other, including:
  - a bottomed cylindrical container capable of containing an egg shell with an egg shell membrane attached thereto and an alkaline solution;
  - an alkaline solution supplying part positioned near the bottom of the container and opened toward the container in a direction enabling the formation of a swirling flow of the alkaline solution in the container; and
  - a hollow egg shell feeding part positioned above and within the container, and coaxially with the center of the swirling flow of the alkaline solution;
- [8] The apparatus for separating an egg shell and an egg shell membrane from each other according to [7], further including a diffusing projection at the center of the inner bottom of the container;

[9] The apparatus for separating an egg shell and an egg shell membrane from each other according to [7] or [8], including a collection channel for egg shell membranes on the outer periphery of the container;

[10] The apparatus for separating an egg shell and an egg shell membrane from each other according to [9], including at least one outlet in the collection channel; and

[11] The apparatus for separating an egg shell and an egg shell membrane from each other according to [10], in which a barrier is provided around the outlet.

Effects of the Invention

The method and apparatus for separating an egg shell and an egg shell membrane from each other of the present invention enables sufficient separation of an egg shell and an egg shell membrane from each other even in a small scale using a simpler method than conventional ones. The method and apparatus for separating an egg shell and an egg shell membrane from each other of the present invention can also provide an egg shell membrane with reduced degradation due to, for example, oxidation.

MODE FOR CARRYING OUT THE INVENTION

Figure 1:
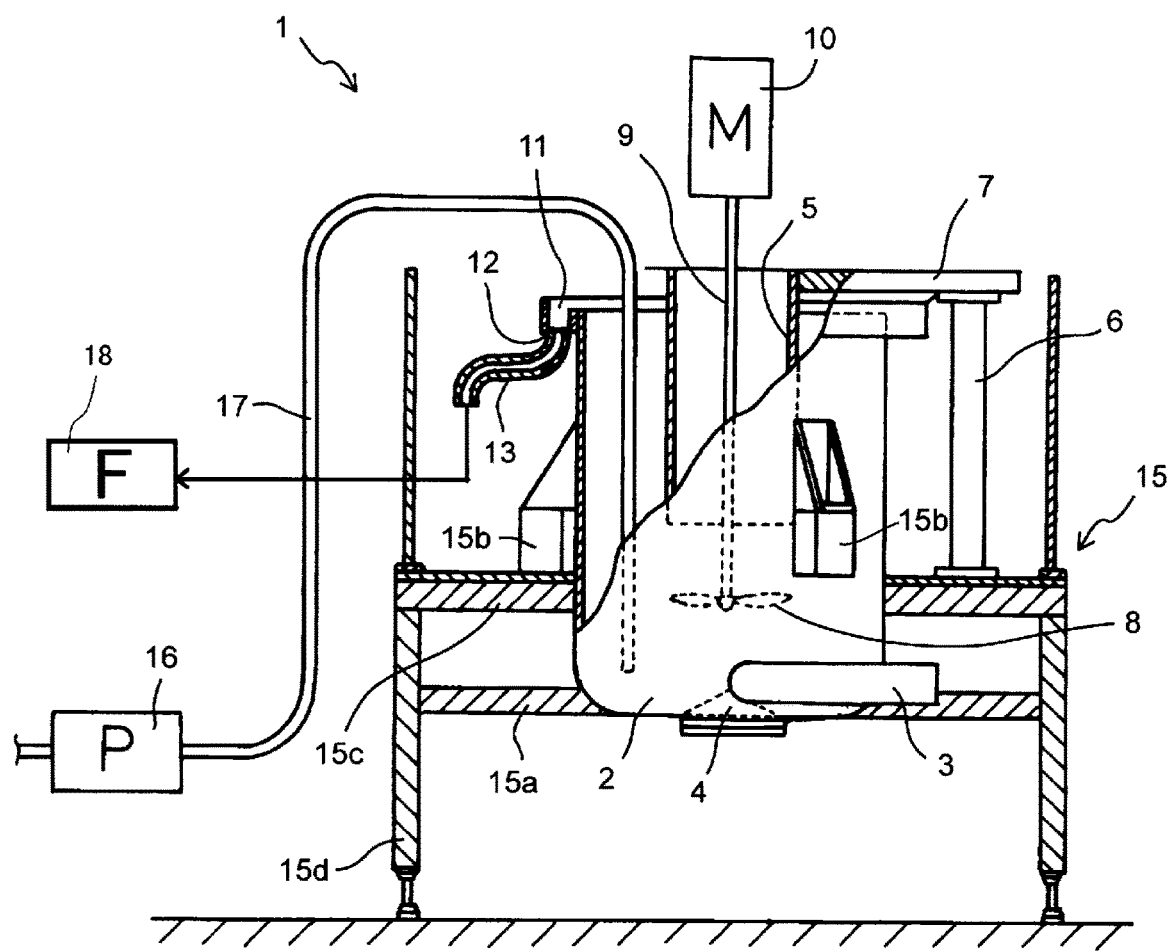
FIG. 1 is a general view showing an apparatus for separating an egg shell and an egg shell membrane from each other in one embodiment of the present invention.

The method for separating an egg shell and an egg shell membrane from each other of the present invention (hereinafter, also referred to as simply "separation method") will be described.

The separation method of the present invention is a method for separating an egg shell and an egg shell membrane, including a step of adding an egg shell with an egg shell membrane attached thereto to a swirling flow of an alkaline solution. An egg shell membrane is detached from an egg shell by the action of an alkaline solution. Additionally, the difference in specific gravity can allow the egg shell membrane to be suspended in the alkaline solution and the egg shell to settle, thereby separating the egg shell and an egg shell membrane from each other. When the solution is changed to water, the egg shell and egg shell membrane do not detach well, and separation by specific gravity does not work.

Suspended egg shell membranes are swept away by the swirling flow of an alkaline solution and eventually gathered on the water surface.

When the swirling flow of an alkaline solution is a vortex flow with a centrifugal force, suspended egg shell membranes are swept away by the vortex flow and gathered on the water surface. This action can be used to efficiently recover egg shell membranes. For example, the alkaline solution is allowed to overflow from the container. A channel is provided for the overflowed alkaline solution. A filter or net is provided on the channel through which the overflowed alkaline solution passes. In this way, egg shell membranes can be filtered out and recovered.

The alkaline solution is, but not particularly limited to, preferably an alkaline solution having a pH from 10 to 14, and preferably an alkaline aqueous solution having a pH from 10 to 14. Since the separated and recovered egg shell membranes will be applied to cosmetics and food products, the alkaline aqueous solution is preferably one usable in the manufacturing process of cosmetics and food products.

Examples of the alkaline aqueous solution include an aqueous sodium hydroxide solution, an aqueous sodium carbonate solution, an aqueous sodium bicarbonate solution, an aqueous ammonia solution, an aqueous potassium hydroxide solution, an aqueous calcium hydroxide solution, sodium acetate, an aqueous ammonium carbonate solution, and an aqueous ammonium chloride solution.

In a preferred embodiment, the separation method of the present invention includes a step of recovering egg shell membranes suspended in an alkaline solution. The recovering method may be, for example, a method of filtering out egg shell membranes from the overflowed alkaline solution by a filter or net as described above; a method of filtering out and recovering egg shell membranes by a filter or net provided in the swirling flow of an alkaline solution; or a method of aspirating egg shell membranes together with an alkaline solution.

In a preferred embodiment, the separation method of the present invention includes a step of recovering settled egg shells. The recovering method may be, for example, a method of aspirating the alkaline solution together with settled egg shells using, for example, a pump; or a method of discharging settled egg shells together with the alkaline solution from the container by configuring the bottom of the container, on which egg shells are to be settled, to be opened freely.

The steps of adding egg shells with egg shell membranes attached thereto, recovering egg shell membranes, and recovering egg shells can be carried out concurrently.

In a preferred embodiment, the separation method of the present invention is a method for separating an egg shell and an egg shell membrane from each other, using an apparatus for separation of egg shell membrane, the apparatus including:

a bottomed cylindrical container with an opening on the top;

an alkaline solution supplying part positioned near the bottom of the container side; and an egg shell feeding part positioned near the center of the opening on the top of the container;

wherein the method includes steps of:

adding an alkaline solution from the alkaline solution supplying part to generate a swirling flow of the alkaline solution in the container;

adding an egg shell with an egg shell membrane attached thereto from the egg shell feeding part; and collecting an egg shell membrane suspended in the swirling flow of the alkaline solution.

The bottomed cylindrical container with an opening on the top has a circular cross section. When the ratio of the radius of the circular bottom to the height of the side is small, egg shell membranes are difficult to be detached.

In a preferred embodiment, the apparatus for separation of egg shell membrane has such a configuration that the alkaline solution supplying part is opened toward the container in a direction enabling the formation of a swirling flow of an alkaline solution in the container. When an alkaline solution is supplied into the container from the alkaline solution supplying part using a pump or the like, the alkaline solution flows along the inner wall of the container and generates a vortex with centrifugal force, forming a swirling flow.

In a further preferred embodiment, the alkaline solution supplying part is installed such that the alkaline solution is discharged in a diagonally upward direction relative to the bottom surface. In this case, a swirling flow flows like a spiral staircase while forming a vortex upward from the bottom of the container, so that suspended egg shell membranes can be moved upward in the container, or toward the water surface.

Instead of installing an alkaline solution supplying part such that the alkaline solution is discharged in a diagonally upward direction relative to the bottom surface, a convex portion may be provided on the bottom of the container. This allows the alkaline solution discharged from the alkaline solution supplying part to hit the convex portion, generating an upward water flow, which can move suspended egg shell membranes upward in the container. The convex portion may be a cone shaped portion provided on the bottom.

In a preferred embodiment, the apparatus for separation of egg shell membrane has a configuration wherein the upper portion of the container is open, allowing the alkaline solution to overflow. This allows suspended egg shell membranes to overflow with the overflowed alkaline solution, and thus installation of a filter or net on the pathway of the overflowed alkaline solution enables efficient recovery of egg shell membranes.

In a preferred embodiment, the apparatus for separation of egg shell membrane has an egg shell feeding part positioned near the center of the top opening of the container. The egg shell feeding part is, for example, a cylinder that is installed concentrically with the center of the container. When an egg shell is fed from the top of the cylinder, the egg shell will be fed near the bottom inside the container through the cylinder. Then, an egg shell membrane will be detached from the egg shell by the action of the alkaline solution, float and flow in the swirling flow, and thereby be separated from the egg shell.

Embodiments of separation apparatus suitable for carrying out the method for separating an egg shell and an egg shell membrane from each other of the present invention (hereinafter, also referred to as simply "separation apparatus") will now be described in detail with reference to the drawings.

In one embodiment of the present invention shown in FIG. 1, the separation apparatus 1 includes:
  a container 2;
  an alkaline solution supplying part 3 positioned near the bottom of the container 2 and opened toward the container in a direction enabling the formation of a swirling flow of the alkaline solution in the container 2;
  a diffusing projection 4 positioned at the center of the inner bottom of the container 2; and
  a hollow egg shell feeding part 5 positioned above and within the container 2, and coaxially with the center of the swirling flow of the alkaline solution.

Figure 2:
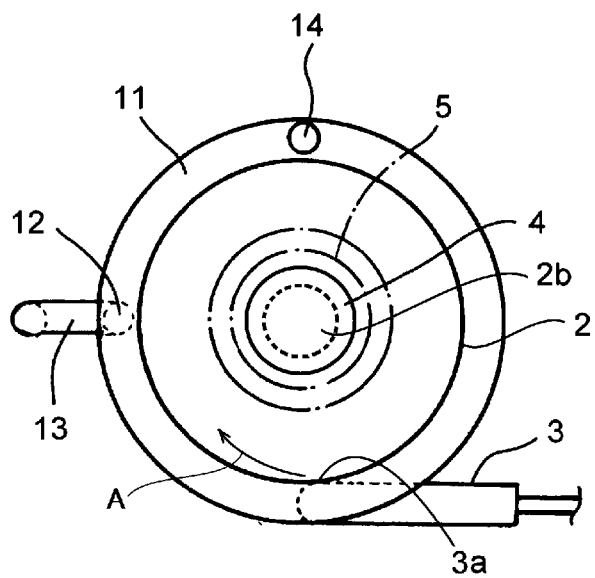
FIG. 2A is a plan view of an important part of the apparatus for separating an egg shell and an egg shell membrane from each other in FIG. 1.
FIG. 2B is a side view of the important part of the apparatus for separating an egg shell and an egg shell membrane from each other in FIG. 1.
Figure 2:
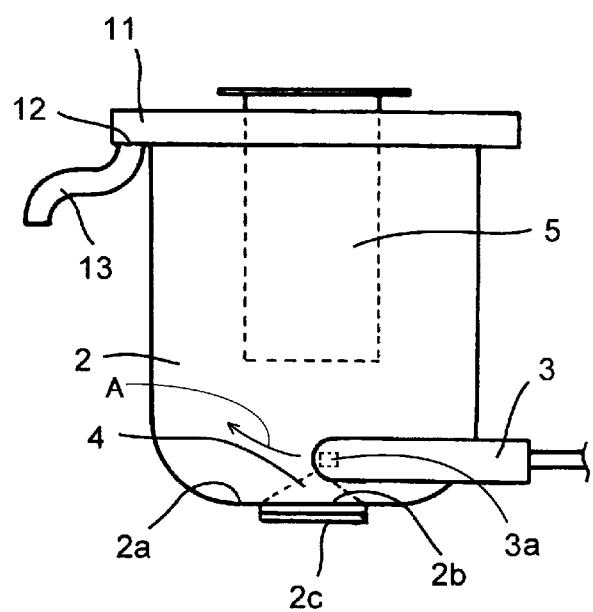

As shown in FIG. 2B, the container 2 is tubular in shape having a bottom 2a and an open top, preferably is cylindrical in shape. Preferred examples of the material of the container 2 include, but not limited to, metal materials, especially stainless steel, in terms of, for example, corrosion prevention and ease of handling. The size of the container can be selected appropriately without limitation based on the amount to be processed of egg shells with egg shell membranes attached thereto. Egg shells with egg shell membranes attached thereto and an alkaline solution are supplied into the container 2, and the egg shells and egg shell membranes are separated from each other in the container 2.

The alkaline solution supplying part 3 is an apparatus for supplying an alkaline solution into the container 2. In the separation apparatus 1 in one embodiment as shown in FIG. 1, the alkaline solution supplying part 3 is installed near the bottom 2a on the side of the container 2. An opening 3a is formed on the side of the container 2 where the alkaline solution supplying part 3 is connected. An alkaline solution is supplied into the container 2 from the alkaline solution supplying part 3 through the opening 3a. The alkaline solution supplying part 3 is connected through piping to another tank in which an alkaline solution has been contained. In addition, the alkaline solution supplying part 3 has a built-in pump or is connected to an external pump so that the alkaline solution can be supplied into the container 2 at a predetermined flow rate and flow speed.

The alkaline solution supplying part 3 has a structure that allows the liquid flow of the alkaline solution supplied into the container 2 to form a swirling flow within the container 2. In one specific embodiment, the structure can be equipped with a nozzle or a current plate, which allows the liquid flow of the alkaline solution from the opening formed on the side of the container 2 into the container 2 to be oriented tangentially or approximately tangentially to the inner side of the container 2. An example of the direction of the liquid flow of the alkaline solution supplied through alkaline solution supplying part 3 into the container 2 is shown by the arrow A in FIGS. 2A and 2B. The liquid flow of the alkaline solution through the alkaline solution supplying part 3 into the container 2 drives the formation of a swirling flow of the alkaline solution in the container 2. This swirling flow agitates egg shells with egg shell membranes attached thereto that are fed into the container 2, thereby promoting the separation of egg shells and egg shell membranes. In a preferred embodiment, the alkaline solution supplying part 3 is installed in the lower portion of the container 2 so that a swirling flow is sufficiently formed in the container 2.

In a further embodiment, the alkaline solution supplying part 3 can be installed such that the alkaline solution is discharged in a diagonally upward direction relative to the bottom surface. By this, a swirling flow flows like a spiral staircase while forming a vortex upward from the bottom of the container, so that suspended egg shell membranes can be moved upward in the container 2, or toward the water surface.

The inner bottom surface of the container 2 has a diffusing projection 4, which has a generally conical shape in the example shown as a convex portion. In preferred embodiments, the diffusing projection 4 is positioned at the center of the inner bottom of the container 2 such that the vertex of the cone-shaped diffusing projection 4 is positioned on the central axis line of the swirling flow of the alkaline solution formed in the container 2.

Installation of the diffusing projection 4 allows the alkaline solution discharged from the alkaline solution supplying part 3 to hit the diffusing projection 4, generating an upward water flow, which can move suspended egg shell membranes upward in the container. In addition, during the use of the separation apparatus 1, egg shells with egg shell membranes attached thereto before separation that settle in the container 2 move along the side of the diffusing projection 4 to the radially outer side of the bottom. The flow speed of the swirling flow of an alkaline solution is relatively higher on the radially outer side of the bottom surface than at the center, which can prevent egg shells with egg shell membranes attached thereto from being left as it is on the bottom. Thus, egg shells with egg shell membranes attached thereto are agitated in the container 2 without being settled, which results in promoted separation of egg shells and egg shell membranes.

The size of the diffusing projection 4 can be selected appropriately based on, for example, the size of the container, and the ability of the alkaline solution supplying part 3 to produce a swirling flow. In preferred embodiments, the positional relationship between the diffusing projection 4 and the alkaline solution supplying part 3 is such that the opening on the side of the container 2, that is connected to the alkaline solution supplying part 3, is formed at a height from the bottom to the top of the diffusing projection 4 to prevent egg shells with egg shell membranes attached thereto from being settled.

An egg shell feeding part 5 that is opened at least at its lower end is installed above the diffusing projection 4. The egg shell feeding part 5 is hollow-shaped, and in one embodiment, can be cylindrical. However, without being limited to the cylindrical shape, the egg shell feeding part 5 can be a polygonal tubular shape. In preferred embodiments, the egg shell feeding part 5 is positioned such that the central axis of the egg shell feeding part 5 coincides with the radial center of the container 2 to allow the center of the swirling flow formed in the container 2 to position inside the egg shell feeding part 5.

Egg shells with egg shell membranes attached thereto are fed from the upper portion to the inside of the egg shell feeding part 5. By feeding egg shells with egg shell membranes attached thereto to inside of the egg shell feeding part 5, the fed egg shells with egg shell membranes attached thereto will be fed near the bottom inside the container 2 through the cylindrical egg shell feeding part 5. Then, the egg shells with egg shell membranes attached thereto are agitated by the alkaline solution and detached from each other by the action of the alkaline solution, and the egg shell membranes float and flow in the swirling flow, and thereby be separated from the egg shells. Egg shell membranes separated from egg shells with egg shell membranes attached thereto in the container 2 have a relatively light specific gravity, and thus tends to gather to the center due to the swirling flow. With the egg shell feeding part 5, it is easy to prevent the egg shell membrane from gathering to the center, disperse it in the alkaline solution between the outer surface of the egg shell feeding part 5 and the inner surface of the container 2, and make it float up toward the liquid surface due to the difference in specific gravity.

In an embodiment, the means for holding the egg shell feeding part 5 at a predetermined position in the container 2 can include a plurality of support pillars 6 around the container 2, and beams or support plates 7 bridged over the support pillars 6, wherein the egg shell feeding part 5 is suspended inside the container 2 from the beams or the support plates 7. A lid can be provided, as necessary, above the top of the container 2. The egg shell feeding part 5 can be attached to the lid. In addition, the above means can include a plurality of radially extending hooking members fixed to the outer sides of the egg shell feeding part 5, which hooking members can be hooked on the top of the container.

An agitating blade 8 can be installed in the container 2 to promote the agitation of the alkaline solution in the container 2. An agitating blade 8 is fixed near the lower end of a shaft 9, which is provided to penetrate the inside of the egg shell feeding part 5. The agitating blade 8 is placed in the container 2 between the lower end of the egg shell feeding part 5 and the diffusing projection 4. The upper end of the shaft 9 is connected to a motor 10 located above the container 2. The driving power of the motor 10 is transmitted by the shaft 9 to rotate the agitating blade 8. In a preferred embodiment, the motor 10 can rotate the agitating blade 8 in a forward and reverse direction. The separation apparatus 1 shown in FIG. 1 includes an alkaline solution supplying part 3 that provides a swirling flow in the container 2 to promote the separation of egg shells from egg shell membranes, and further includes an agitating blade 8 that can agitate the alkaline solution in the container 2 to further promote the separation of egg shells from egg shell membranes.

A collection channel 11 for egg shell membranes is installed on the outer side near the top of the container 2. FIGS. 2A and 2B show the main parts of the container 2 and its attached equipment in plane view and side view, respectively. In FIG. 2A, the egg shell feeding part 5 is removed and thus shown as an imaginary line. As shown in the plane view of FIG. 2A, the collection channel 11 for egg shell membranes has a circular groove, as its basic structure, closely attached to the outer side of the container 2. The collection channel 11 can be made of a metal material, or other materials, such as a plastic material. At least one outlet 12 is provided on the bottom of the collection channel 11. A discharge pipe 13 is connected to the outlet 12. The discharge pipe 13 can be made of a metal material, or other materials, such as a plastic material.

Continuous supply of an alkaline solution from the alkaline solution supplying part 3 into the container 2 leads to the alkaline solution to overflow from the top of the container 2 into the collection channel 11. Egg shell membranes that are agitated by, for example, a swirling flow of an alkaline solution and separated from egg shells with egg shell membranes attached thereto rise to the surface of the alkaline solution in the container 2 due to the difference in specific gravity, overflow from the top of the container 2 together with the alkaline solution and are led to the collection channel 11, then pass through the discharge pipe 13 from the outlet 12, and are collected by, for example, the collection apparatus 18 shown in FIG. 1. In the collection apparatus 18, egg shell membranes are separated from the mixture of the collected egg shell membranes and alkaline solution by a filter or a net. A filter or a net can also be installed in the container 2.

Figure 3:
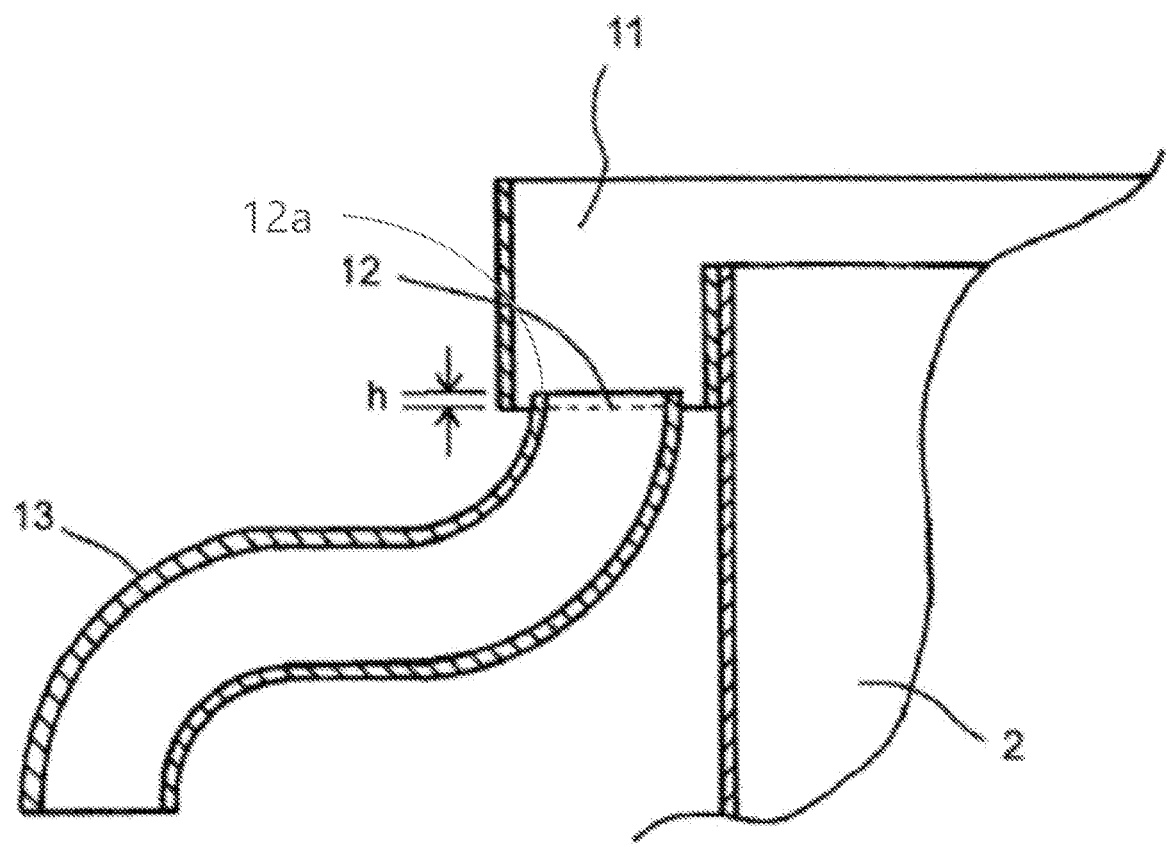
FIG. 3 is a partially-enlarged sectional view of the apparatus for separating an egg shell and an egg shell membrane from each other in FIG. 1.

FIG. 3 shows a partially-enlarged sectional view of the connection between the outlet 12 of the collection channel 11 and the discharge pipe 13. One end of the discharge pipe 13 is inserted into the opening of the outlet 12 from below the collection channel 11, and the tip of the discharge pipe 13 is positioned above the inner bottom of the groove of the collection channel 11.

The liquid that overflows from the top of the container 2 into the collection channel 11 contains not only egg shell membranes that have risen to the surface due to the difference in specific gravity but also relatively small egg shells that have risen to the surface due to agitation by the swirling flow in the container 2. Egg shells contained in the liquid settle to the bottom of the groove of the collection channel 11. Therefore, in a preferred embodiment, a barrier 12a against egg shells is provided around the outlet 12. As the barrier 12a, specifically in the example shown in FIG. 3, the tip of the discharge pipe 13 is positioned above the inner bottom of the groove of the collection channel 11, which greatly reduces the rate of egg shell contamination in egg shell membranes collected from the discharge pipe 13. The height from the inner bottom of the groove of the collection channel 11 to the tip of the discharge pipe 13, depending on the size of the container 2, the width of the groove of the collection channel 11, and the amount of an alkaline solution supplied into the container 2, can be, for example, about 1 to 10 mm, preferably about 5 mm.

In FIG. 3, one embodiment is shown, wherein the tip of the discharge pipe 13 is positioned above the inner bottom of the groove of the collection channel 11, but the structure of the outlet 12 and its vicinity is not limited to the embodiment shown in FIG. 3. For example, such a structure may be used that a weir with a height of 3 to 10 mm is formed around the outlet 12 inside the groove of the collection channel 11 to dam up egg shells, and egg shell membranes are led over the weir and through the outlet 12 to the discharge pipe 13.

A cleaning hole 14 can be formed at the bottom of the groove of the collection channel 11, apart from the outlet 12, and a removable lid can be installed on the cleaning hole 14. In cleaning the collection channel 11, the lid can be removed from the cleaning hole 14 and egg shells settled on the bottom of the collection channel 11 can be discharged through the cleaning hole 14.

The separation apparatus 1 in the embodiment as shown in FIG. 1, including a container 2 equipped with a collection channel 11 as described above, includes a workbench 15 to hold the container 2. The workbench 15 includes a supporting lower plate 15*a* facing the bottom of the container 2, and a plurality of supporting columns 15*b* attached around the container 2. The container 2 is held by the supporting lower plate 15*a* and the supporting columns 15*b*. The supporting column 15*b* is fixed on a supporting upper plate 15*c*, which has a hole to accommodate the container 2. The workbench 15 can tilt the container 2, as necessary. In the case where the diameter or height of the container 2 is larger than 1 m, the supporting upper plate 15*c* of the workbench 15 can be used as a floor for workers to work on. The workbench 15 can also be equipped with stairs for workers to get on and off the supporting upper plate 15*c*. The workbench 15 can further be equipped with fixable casters at the bottom of the legs 15*d* of the workbench 15 to make the workbench 15 mobile. A pump 16 for collecting egg shells settling on and near the bottom of the container 2 after the separation operation between egg shells and egg shell membranes using the separation device 1 is provided to the workbench 15 or prepared separately from the workbench 15. One end of a hose 17 is connected to the pump 16, and the other end of the hose 17 reaches near the bottom of the container 2. Any type of pump 16 can be used, but because of the settled egg shells being in the form of sludge mixed with an alkaline solution, the pump 16 may be damaged by the sludge-like egg shells. Thus, in a preferred embodiment, the pump 16 is a hose pump.

In order to collect egg shells in the container 2, a collection hole that can be freely opened and closed may be formed on the bottom 2*a* of the container 2, instead of the pump 16 and the hose 17. After the separation operation between egg shells and egg shell membranes, egg shells settled on and near the bottom of the container 2 can be discharged from the collection hole. However, in the case where a collection hole is formed on the bottom 2*a* of the container 2, egg shells may get into the closing means for the collection hole, such as a lid or valve, during operation, making it impossible to close the hole sufficiently. In addition, the pipes downstream of the collection hole may be clogged with egg shell sludge. Thus, in a preferred embodiment, the pump 16 and the hose 17 described above are used when collecting egg shells in the container 2, rather than the collection hole described above.

However, a cleaning hole 2*b* can also be formed on the bottom 2*a* of the container 2, in addition to the pump 16 and the hose 17 as described above. When a cleaning hole 2*b* is formed, an opening/closing lid 2*c* can be provided to seal the cleaning hole 2*b*. The cleaning hole 2*b* can be formed such that it is positioned below the diffusing projection 4 on the bottom 2*a* of the container 2.

The separation operation using the separation apparatus 1 in one embodiment will be described. With the cleaning hole 2*b* on the bottom 2*a* of the container 2 closed with the opening/closing lid 2*c*, egg shells with egg shell membranes attached thereto are fed to the container 2 from the egg shell feeding part 5 at the top of the container 2 in the amount for one operation. An alkaline solution is supplied into the container 2 from the alkaline solution supplying part 3. The alkaline solution can be, for example, an alkaline aqueous solution having a pH from 10 to 14. Egg shells with egg shell membranes attached thereto can be pre-treated, for example, crushed before being added to the container 2. Egg shells with egg shell membranes attached thereto may be fed in the amount for one operation at a time, or the amount for one operation may be divided into smaller portions or fed continuously in small quantities. The timings of feeding egg shells with egg shell membranes attached thereto into the container 2 and of supplying the alkaline solution may be in any order and may overlap, but they are preferably added to a swirling flow of an alkaline solution.

The liquid flow of an alkaline solution supplied into the container 2 from the alkaline solution supplying part 3 generates a swirling flow with a centrifugal force in the container 2. The swirling flow agitates egg shells with egg shell membranes attached thereto in the alkaline solution and separates egg shells and egg shell membranes from each other. If necessary, the motor 10 is driven to rotate the agitating blade 8 near the lower end of the shaft 9 freely in a forward and reverse direction for further agitation, promoting the separation of egg shells and egg shell membranes from each other.

An alkaline solution is continuously fed into the container 2 to allow an alkaline solution and egg shell membranes after separation to overflow from the top of the container 2 into the collection channel 11. During the step of collecting egg shell membranes, egg shell membranes are collected, for example, by a collection apparatus 18, from the outlet 12 of the collection channel 11 through the discharge pipe 13.

When the amount of egg shell membranes in the alkaline solution overflowing from the container 2 is sufficiently small after a predetermined period of time, the supply of the alkaline solution is stopped. Then, as a step of collecting the settled egg shells, the pump 16 is operated to collect egg shells in the container 2 through the hose 17. After collecting egg shell membranes and collecting egg shell, the collection channel 11 and the container 2 are cleaned to prepare for the next operation.

The separation apparatus 1 shown in FIG. 1 may be operated solely, or multiple separation apparatus 1 may be prepared and started simultaneously, or sequentially at different times.

The separation apparatus of the present invention has been described above with reference to embodiments and drawings, but the present invention is not limited to these embodiments and drawings, and many variations can be made.

DESCRIPTION OF SYMBOLS

1 Separation apparatus
2 Container
3 Alkaline solution supplying part
4 Diffusing projection
5 Egg shell feeding part
6 Support pillar
7 Support plate
8 Agitating blade
9 Shaft
10 Motor
11 Collection channel
12 Outlet
13 Discharge pipe
14 Cleaning hole
15 Workbench
16 Pump
17 Hose
18 Collection apparatus

The invention claimed is:

1. A method for separating an egg shell and an egg shell membrane from each other, comprising
 a step of adding an egg shell with an egg shell membrane attached thereto to a swirling flow of an alkaline solution,
 wherein the alkaline solution has a pH of 10 to 14 and is an aqueous calcium hydroxide solution.

2. The separation method according to claim 1, wherein the swirling flow is a vortex flow with a centrifugal force.

3. The separation method according to claim 2, comprising a step of collecting an egg shell membrane suspended in the alkaline solution.

4. The separation method according to claim 2, comprising a step of collecting a settled egg shell.

5. The separation method according to claim 1, comprising a step of collecting an egg shell membrane suspended in the alkaline solution.

6. The separation method according to claim 5, comprising a step of collecting a settled egg shell.

7. The separation method according to claim 1, comprising a step of collecting a settled egg shell.

8. A method for separating an egg shell and an egg shell membrane from each other, using an apparatus for separation of egg shell membrane, the apparatus comprising:
 a bottomed cylindrical container with an opening on the top;
 an alkaline solution supplying part positioned near the bottom of the container side; and
 an egg shell feeding part positioned near the center of the opening on the top of the container;
 wherein the method comprises steps of:
  adding an alkaline solution from the alkaline solution supplying part to generate a swirling flow of the alkaline solution in the container;
  adding an egg shell with an egg shell membrane attached thereto from the egg shell feeding part; and
  collecting an egg shell membrane suspended in the swirling flow of the alkaline solution,
 wherein the alkaline solution has a pH of 10 to 14 and is an aqueous calcium hydroxide solution.

9. An apparatus for separating an egg shell and an egg shell membrane from each other, comprising:
 a bottomed cylindrical container capable of containing an egg shell with an egg shell membrane attached thereto and an alkaline solution;
 an alkaline solution supplying part positioned near the bottom of the container and opened toward the container in a direction enabling the formation of a swirling flow of the alkaline solution in the container; and
 a hollow egg shell feeding part positioned above and within the container, and coaxially with the center of the swirling flow of the alkaline solution,
 wherein the alkaline solution has a pH of 10 to 14 and is an aqueous calcium hydroxide solution.

10. The apparatus for separating an egg shell and an egg shell membrane from each other according to claim 9, further comprising a diffusing projection at the center of the inner bottom of the container.

11. The apparatus for separating an egg shell and an egg shell membrane from each other according to claim 10, comprising a collection channel for egg shell membranes on the outer periphery of the container.

12. The apparatus for separating an egg shell and an egg shell membrane from each other according to claim 9, comprising a collection channel for egg shell membranes on the outer periphery of the container.

13. The apparatus for separating an egg shell and an egg shell membrane from each other according to claim 12, comprising at least one outlet in the collection channel.

14. The apparatus for separating an egg shell and an egg shell membrane from each other according to claim 13, wherein a barrier is provided around the outlet.

* * * * *